June 5, 1956 S. M. BACKSTROM 2,748,575
ABSORPTION REFRIGERATION
Filed Dec. 2, 1952 2 Sheets-Sheet 1

PARTS ENCLOSED
IN VESSELS 48 AND 49
EMBEDDED IN INSULATION

INVENTOR.
Sigurd Mattias Backstrom
BY Edward A. Venanda
his ATTORNEY

June 5, 1956 S. M. BACKSTROM 2,748,575
ABSORPTION REFRIGERATION
Filed Dec. 2, 1952 2 Sheets-Sheet 2

PARTS ENCLOSED IN
VESSELS 48 AND 49
EMBEDDED IN INSULATION

INVENTOR.
Sigurd Mattias Backstrom
Edmund A. Iwander
BY
ATTORNEY

United States Patent Office 2,748,575
Patented June 5, 1956

2,748,575

ABSORPTION REFRIGERATION

Sigurd Mattias Backstrom, Stockholm, Sweden, assignor to Aktiebolaget Elektrolux, Stockholm, Sweden, a corporation of Sweden Application December 2, 1952, Serial No. 323,600

Claims priority, application Sweden December 6, 1951

11 Claims. (Cl. 62—119.5)

My invention relates to refrigeration systems of the absorption type and more particularly to such systems in which an inert gas or pressure equalizing agent is employed.

It is an object of my invention to effect improvements in systems of this type, particularly to provide new arrangements for insulating the vapor expulsion unit or generator from the surroundings.

Another object of the invention is to provide such new arrangements in which a vapor expulsion unit or generator, having a cluster of vertical pipes forming component parts thereof, is thermally shielded from the surroundings with the aid of one or more double-walled vessels having a vacuum between the inside and outside walls thereof.

A further object of the invention is to thermally shield and insulate the vapor expulsion unit or generator from the surroundings with a pair of opposing double-walled vacuum vessels which are united or connected at the region of the adjacent open ends thereof and at which region all of the fluid and electrical connections for the generator conveniently pass into the insulated interior.

Figure 1:
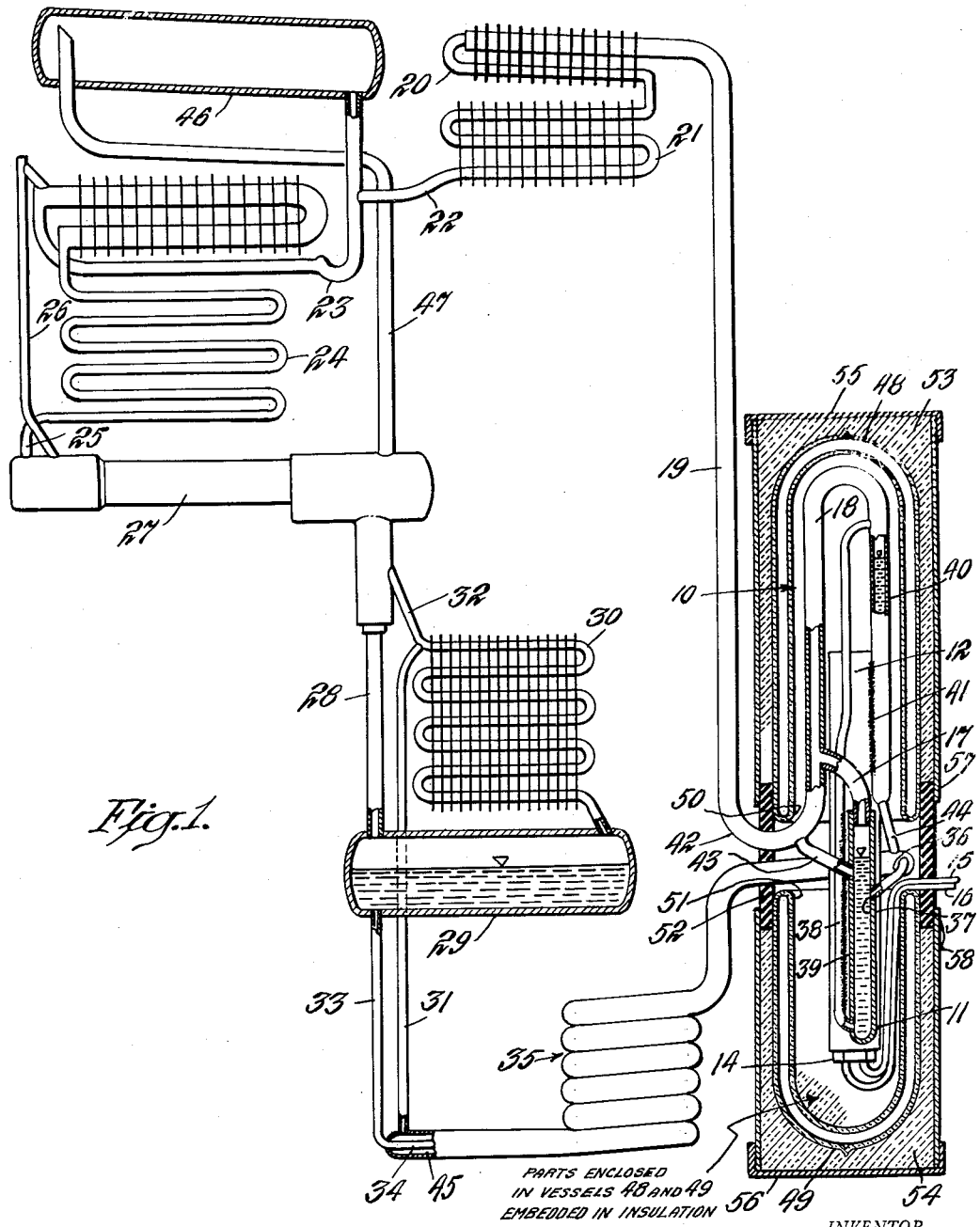
Figure 2:
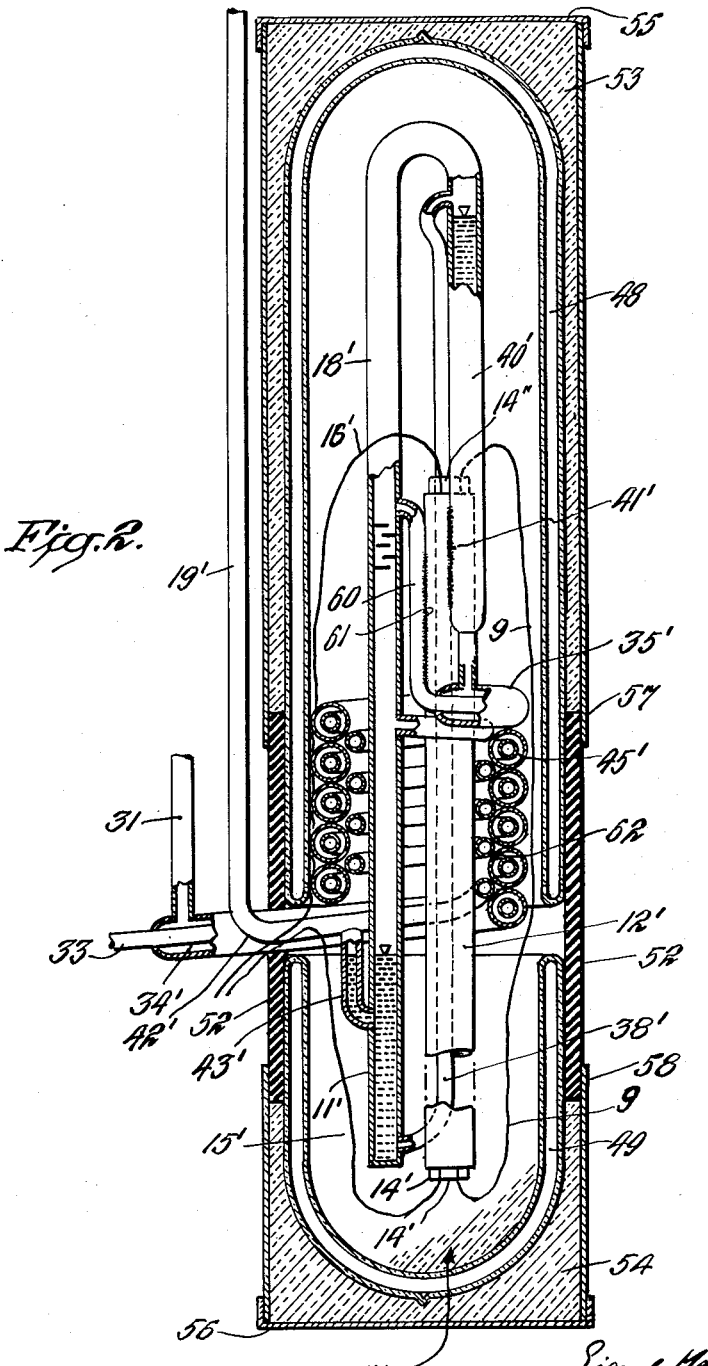

The above and other objects and advantages of the invention will be more fully understood upon reference to the following description and accompanying drawings forming a part of this specification, and of which:

Fig. 1 illustrates more or less diagrammatically an absorption refrigeration system of the inert gas type embodying the invention; and Fig. 2 is a fragmentary view of a refrigeration system like that shown in Fig. 1 diagrammatically illustrating another embodiment of the invention.

In the drawings I have shown my invention in connection with an absorption refrigeration system of a uniform pressure type which is well known in the art and in which an inert pressure equalizing gas is employed. Such a refrigeration system comprises a generator or vapor expulsion unit 10 including a boiler or pipe 11 containing a refrigerant, such as ammonia, in solution in a body of absorption liquid, such as water. Heat is supplied to the boiler 11 through the wall of a heating tube or flue 12 thermally connected therewith along a vertically extending zone, as by welding, for example. The heating tube 12, which is closed at its upper end, desirably is heated by an electrical heating element 14 adapted to be inserted into the lower end of tube 12 and to which electrical energy from a suitable source of supply is delivered by insulated conductors 15 and 16.

The heat supplied to the boiler 11 and its contents expels refrigerant vapor out of solution and such vapor passes from the upper part of boiler pipe 11 through conduits 17, 18 and 19 to an air cooled rectifier 20 and from the latter into an air cooled condenser 21 in which it is condensed and liquefied. Liquid refrigerant flows from condenser 21 through conduits 22 and 23 into a cooling element or evaporator 24 in which it evaporates and diffuses into an inert pressure equalizing gas, such as hydrogen, which enters through a conduit 25. Due to evaporation of refrigerant fluid into inert gas, a refrigerating effect is produced with consequent absorption of heat from the surroundings.

The rich gas mixture of refrigerant vapor and inert gas formed in cooling element 24 flows from the upper part thereof through a conduit 26, one passage of a gas heat exchanger 27, conduit 28 and absorber vessel 29 into the lower end of an absorber coil 30. In absorber coil 30 the rich gas mixture flows countercurrent to downwardly flowing absorption liquid which enters through a conduit 31. The absorption liquid absorbs refrigerant vapor from inert gas, and inert gas weak in refrigerant flows from absorber coil 30 in a path of flow including conduit 32, another passage of gas heat exchanger 27 and conduit 25 into the lower part of cooling element 24.

The circulation of gas in the gas circuit just described is due to the difference in specific weight of the columns of gas rich and weak, respectively, in refrigerant vapor. Since the column of gas rich in refrigerant vapor and flowing from cooling element 24 to the absorber coil 30 is heavier than the column of gas weak in refrigerant and flowing from the absorber coil 30 to cooling element 24, a force is produced or developed within the system for causing circulation of gas in the manner described.

Absorption solution enriched in refrigerant flows from the absorber vessel 29 through a conduit 33, inner passage 34 of liquid heat exchanger 35, and conduit 36 to a region 37 of boiler pipe 11 below the liquid surface level therein. A column of liquid is maintained in boiler pipe 11 having a liquid surface substantially at the same level as the liquid surface in the absorber vessel 29. Absorption liquid of decreasing refrigerant concentration flows downwardly in boiler pipe 11 and passes from the bottom closed end thereof into the lower end of a lift tube or pump pipe 38. The pump pipe 38 is arranged in thermal exchange relation with the heating tube 12 along a vertical zone 39, as by welding, for example, such zone extending upward to a region above the liquid surface level in the boiler pipe 11. Liquid is raised by thermosiphon or vapor-liquid lift action through pipe 38 to the upper part of a standpipe 40 under the influence of the reaction head formed by the column of absorption liquid in the boiler pipe 11. In order to increase the rate at which refrigerant vapor is generated in the vapor expulsion unit 10, the lower part of the standpipe or conduit 40 may be heat conductively connected to the upper part of heating tube 12 at 41, as by welding, for example. Refrigerant vapor expelled out of solution in boiler 11 and standpipe 40, together with refrigerant vapor passing from the upper end of pipe 38, flows from the boiler through conduits 18 and 19 to the condenser 21, as previously explained. The conduit or standpipe 40 and conduit 18 form parallel arms of an inverted U-shaped loop, and the lower end of conduit 18 is connected by a U-bend 42 with the lower end of conduit 19. Any condensate formed and collecting in the U-bend 42 drains therefrom through a conduit 43 into the upper part of boiler pipe 11. The absorption liquid from which refrigerant vapor has been expelled flows from the standpipe 40 through a conduit 44, outer passage 45 of the liquid heat exchanger 35 and conduit 31 into the upper part of the absorber coil 30. The circulation of absorption solution in the liquid circuit just described is effected by raising of liquid through pipe 38.

The outlet end of the condenser 21 is connected by an upper extension of conduit 23, vessel 46 and conduit 47 to a part of the gas circuit, as at one end of gas heat exchanger 27, for example, so that any inert gas which may pass through the condenser 21 can flow into the gas circuit. Refrigerant vapor not liquefied in the condenser flows through the upper part of conduit 23 to displace inert gas in vessel 46 and force such gas through conduit 47 into the gas circuit. The effect of forcing gas into the gas circuit in this manner is to raise the total pressure in the entire system, whereby an adequate condensing pressure is obtained to insure condensation of refrigerant vapor in condenser 21.

The vapor expulsion unit of Fig. 1 is formed of piping to provide a compact bundle or cluster of parts which is elongated in the vertical direction and is relatively narrow or slender in horizontal cross-section. Accordingly, the heating tube 12, pump 38, boiler 11 and standpipe 40 are formed of pipes or conduits disposed closely adjacent to one another. In order to reduce radiation heat losses and conserve heat, it is usually the practice to embed the parts of the generator or vapor expulsion unit in a body of insulating material having a passage therein which extends to the exterior of the insulating body, so that the electrical heating element may be readily inserted into and removed from the heating tube.

In accordance with my invention, the vapor expulsion unit 10 is completely insulated from the surroundings with the aid of a pair of double-walled vessels 48 and 49 each having a vacuum between the outside and inside walls thereof. The vessels 48 and 49 are elongated and essentially U-shaped in section with the spaced apart inside and outside walls thereof united or joined at the open ends 50 and 51, respectively. The vessels 48 and 49 are in end to end relation with the open ends 50 and 51 spaced apart at a region approximately midway between the ends of the heating tube 12. The vacuum vessels desirably are formed of glass with the inside surfaces of the inner walls provided with a bright coating of suitable material which is highly reflective in character.

The open ends of the double-walled vacuum vessels 48 and 49 are closed and sealed by a sleeve or tube 52 which is formed of suitable insulating material preferably elastic or resilient in character to facilitate positioning of such sleeve over the open ends of the vacuum vessels. In this way a snug fit can be obtained between the open ends of the vacuum vessels and connecting insulating sleeve 52 therebetween.

All of the fluid and electrical connections to the parts within the vacuum insulation just described pass through suitable openings formed in the wall of the insulating sleeve 52. The electrical conductors 15 and 16 pass through one opening in the wall of the insulating sleeve. All of the refrigerant vapor generated in the vapor expulsion unit 10 flows to the condenser 21 through the U-bend 42 which passes through another opening in the insulating sleeve 52. The upper end of the liquid heat exchanger piping, which includes the outer conduit 45 through which the smaller inner conduit 34 extends, passes through a third opening in the wall of the insulating sleeve 52.

If desired, protective layers 53 and 54 of suitable insulating material may be employed in each of which one of the double-walled vacuum vessels 48 and 49 nests. The separate bodies or layers 53 and 54 may be retained in open-ended outer shells 55 and 56, respectively, having wall parts 57 and 58 which overlie the top and bottom edges of the insulating sleeve 52.

In Fig. 2, in which parts similar to those shown in Fig. 1 are designated by the same reference numerals, I have illustrated another embodiment of the invention which differs from the first-described embodiment in that the liquid heat exchanger coil 35' is disposed within the bottom part of the upper double-walled vessel 48. In Fig. 2 rich absorption liquid flows from the absorber vessel through conduit 33 and the inner passage 34' of the liquid heat exchanger coil 35' into the lower end of a vapor-liquid lift tube 60. The tube or pump 60 is heat conductively connected at 61 to the upper part of heating tube 12'. Liquid is raised by vapor-liquid lift action through pump 60 into conduit 18', the lower end of which is connected to the pipe or conduit 11' in which a column of relatively rich absorption liquid is maintained.

Liquid is raised by vapor-liquid lift action from the bottom closed end of conduit 11' through a tube or pump 38' heat conductively connected to the bottom part of the heating tube 12'. Liquid is lifted in pump 38' under the influence of the reaction head formed by the column of liquid in conduit 11', such raised liquid entering the upper part of the conduit 40'. The lower part of conduit 40' is heat conductively connected at 41' to the heating tube 12', whereby refrigerant vapor will be expelled from solution. Absorption liquid of decreasing refrigerant concentration flows downwardly in conduit 40' and flows therefrom through the outer passage 45' of the liquid heat exchanger coil 35' and conduit 31 to the upper part of the absorber coil.

Refrigerant vapor generated in conduit 40' and such vapor entering the latter from the upper end of pump pipe 38, flow through conduit 18' and a helical coil 62 to the condenser, the lower end of coil 62 including a section 42' which is connected to conduit 19' of the vapor supply line leading to the condenser.

In Fig. 2 the conduits 40' and 18' form spaced apart arms of an inverted U-shaped loop, the arm or conduit 18' extending downwardly to provide the conduit 11'. Conduit 11' is spaced from heating tube 12' and hence more or less rich absorption liquid is raised in pump 38' to conduit 40' which constitutes the boiler in which the principal part of the vapor is generated in the vapor expulsion unit. However, conduit 11' may be heat conductively connected to the lower part of heating tube 12', if this is deemed desirable or necessary, in the same manner that conduit 11 is thermally connected to heating tube 12 in Fig. 1.

In Fig. 1 generated refrigerant flows upwardly from the liquid surface levels in conduits 11 and 40 into conduit 18 which then extends downwardly to the bend 42 through which refrigerant vapor flows to the condenser. In order to analyze the vapor flowing to the condenser in the embodiment of Fig. 2, the pump pipe 60 is provided in this embodiment to raise liquid to a higher level than would be maintained in such pipe due to gravity flow from the absorber vessel. In this way the height of the liquid column in conduit 11' of Fig. 2 is independent of the liquid surface level in the absorber vessel which is not true of the liquid surface level in conduit 11 of Fig. 1.

The absorption liquid raised by pump 60 flows downwardly in conduit 18' of Fig. 2 and generated vapor flowing in this conduit passes in intimate physical contact with such liquid, whereby absorption liquid vapor accompanying refrigerant vapor will be removed from the latter. After being analyzed, the vapor flows downwardly through coil 62 which is snugly disposed within and in good heat exchange relation with the outer passage 45' of the liquid heat exchanger coil 35'. In order to remove any liquid which condenses and collects in the lower section 42' of coil 62, a drain conduit 43' conducts such liquid to the conduit 11' at a region below the liquid level therein.

In Fig. 2 heat is supplied to the heating tube 12' with the aid of two electrical heating elements 14' and 14" adapted to be inserted into the lower and upper ends, respectively, of the heating tube 12'. The heating elements are connected in series relation to the source of electrical supply by conductors 9, 15' and 16', the conductors 15' and 16' passing through an opening in the insulating sleeve 52. As in the embodiment of Fig. 1, the lower straight section of the liquid heat exchanger coil 35' and bend 42' of the vapor supply line in Fig. 2 also pass through openings in the insulating sleeve 52.

Since the conduit 11' is in spaced relation with the heating tube 12' and the principal part of the vapor is generated in conduit 40', the lower heating element may be of smaller size than the upper heating element 14", thus enabling the vapor expulsion unit of Fig. 2 to be operated in such a way that the lower end of the heating tube 12' will be maintained at a lower temperature than the upper end thereof. Instead of employing two separate electrical heating elements, a single heating cartridge may be employed which is insertable at the top of the heating tube, for example, and provided with two sections or parts suitably insulated from one another and of which the bottom section is adapted to operate at a lower temperature than the top or higher section. The above-described arrangement for heating pump pipe 38' and conduit 40' is desirable in Fig. 2, because heat can be supplied at a much lower temperature to the lower part of heating tube 12' to effect operation of pump 38' than to the upper part of the heating tube to expel the principal part of the refrigerant vapor from solution in the conduit 40' which constitutes the boiler proper.

In view of the foregoing, it will now be understood that an improved vacuum insulation structure has been provided for the generator or vapor expulsion unit of absorption refrigeration systems of the inert gas type. The vacuum insulation arrangement of the invention is especially useful in that it can be installed when the refrigeration system is completely fabricated and after the numerous metal parts thereof are welded together and tested for leaks on many occasions during the fabricating process. After the refrigeration system is completed, the rather fragile double-walled glass vessels and insulating ring therebetween may be installed about the parts of the vapor expulsion unit in the manner shown in Figs. 1 and 2 and described above.

In order to increase the insulating effect derived from the double-walled vacuum vessels 48 and 49, it is desirable to employ a body of solid insulating material within the vacuum vessels and the gap therebetween at the region of the insulating sleeve 52. Such a body of insulating material, which may consist of glass fibers, rock wool or the like, is useful for the purpose of thermally shielding different parts of the vapor expulsion unit adapted to operate at different temperature levels. In order that Figs. 1 and 2 will be as clear as possible and easily understood, the entire space within the double-walled vacuum vessels 48 and 49 has not been shaded with the usual symbol indicating the presence of insulating material. However, the symbol for insulation is shown in a small area at the closed end of vessel 49 in both Figs. 1 and 2 and a suitable caption employed, so that the use of insulating material about the parts of the vapor expulsion unit will be indicated upon inspection of the drawings.

Although I have shown and described particular embodiments of my invention, it will be obvious to those skilled in the art that various changes and modifications may be made without departing from the spirit and scope of the invention. For example, in the embodiment of Fig. 2 in which the higher temperature parts of the vapor expulsion unit are located within the top double-walled vacuum vessel 48, the bottom double-walled vacuum vessel 49 in certain instances may be omitted and solid insulating material may be retained within the entire interior of the bottom shell 56, such insulating material also being retained within the double-walled vacuum vessel 48. I, therefore, aim in the following claims to cover all such modifications and changes as fall within the true spirit and scope of the invention.

What is claimed is:

1. In an absorption refrigeration system having a vapor supply line, a circuit for circulation of absorption liquid comprising an absorber and a vertically extending generator and liquid heat exchanger therebetween having passages for flowing in thermal relation absorption liquid rich and weak, respectively, in refrigerant, a plurality of upright pipes in the immediate vicinity of one another, one of said pipes forming a heating tube, said generator comprising several of said pipes which are connected in said circuit and at least two of which contain absorption liquid arranged to receive heat from said heating tube, said two pipes respectively forming a boiler which communicates with the vapor supply line and a vapor- liquid lift tube, and means for thermally insulating said generator and said heating tube from the surroundings comprising a multi-section insulating structure, at least one of said sections constituting a double-walled vessel, having a vacuum between the inside and outside walls thereof, which envelops one end of said generator and extends in a vertical direction toward the opposite end thereof, another section of said insulating structure being connected to the open end of said double-walled vessel, a plurality of conduits, said other section being apertured for said conduits to pass therethrough, said conduits conveying refrigerant vapor from said boiler to said vapor supply line and also rich and weak absorption liquid from and to said absorber, respectively.

2. An absorption refrigeration system as set forth in claim 1 in which the other apertured section of said insulating structure constitutes an intermediate section of annular form having one end thereof connected to the open end of said double-walled vessel.

3. An absorption refrigeration system as set forth in claim 2 in which the apertured intermediate section of said insulating structure is formed with openings for said conduits which are disposed between spaced apart horizontal planes having a vertical height therebetween which is approximately one-third or less of the total vertical height of said generator.

4. An absorption refrigeration system as set forth in claim 1 in which said liquid heat exchanger is disposed within said insulating structure.

5. An absorption refrigeration system as set forth in claim 1 in which said multi-section insulating structure comprises a pair of double-walled vessels, each having a vacuum between the inside and outside walls thereof, which envelop the opposite ends of said generator and the opposing open ends of which have a gap therebetween, the other apertured section of said insulating structure constituting an intermediate insulating section of annular form which connects said double-walled vacuum vessels.

6. An absorption refrigeration system as set forth in claim 5 in which an electrical heating element is disposed within said heating tube, and conductors connected to said heating element for supplying electrical energy thereto, the intermediate section of said insulating structure also being apertured for said conductors to pass therethrough.

7. An absorption refrigeration system as set forth in claim 6 in which said double-walled vessels are formed of glass and said intermediate section is formed of elastic and deformable material.

8. An absorption refrigeration system as set forth in claim 7 in which the space within said insulating structure contains a material like glass fibers, rock wool or the like, for example, having poor thermal conductivity.

9. An absorption refrigeration system as set forth in claim 8 including a body of insulating material having a cavity in which one of said double-wall vessels nests.

10. An absorption refrigeration system as set forth in claim 9 including an open-ended shell in which said body of insulating material is retained.

11. In an absorption refrigeration system having a vapor supply line, a circuit for circulation of absorption liquid comprising an absorber and a vertically extending generator and liquid heat exchanger therebetween having passages for flowing in thermal relation absorption liquid rich and weak, respectively, in refrigerant, a plurality of upright pipes in the immediate vicinity of one another, one of said pipes forming a heating tube, said generator comprising several of said pipes which are connected in said circuit and at least two of which contain absorption liquid arranged to receive heat from said heating tube, said two pipes respectively forming a boiler which communicates with the vapor supply line and a vapor-liquid lift tube, and means for thermally insulating said generator and said heating tube from the surroundings comprising a multisection insulating structure, at least one of said sections constituting a double-walled vessel, having a vacuum between the inside and outside walls thereof, which envelops one end of said generator and extends in a vertical direction toward the opposite end thereof, another section of said insulating structure being connected to the open end of said double-walled vessel, said other section forming a part of said insulating structure which is of a non-vacuum type, a plurality of conduits, said last-mentioned part being apertured for said conduits to pass therethrough, said conduits conveying refrigerant vapor from said boiler to said vapor supply line and also rich and weak absorption liquid from and to said absorber, respectively.

References Cited in the file of this patent

UNITED STATES PATENTS

| | | |
|---|---|---|
| 1,521,148 | Dennett | Dec. 30, 1924 |
| 2,138,885 | Ross | Dec. 6, 1938 |
| 2,504,784 | Ashby | Apr. 18, 1950 |
| 2,538,011 | Kogel | Jan. 16, 1951 |

FOREIGN PATENTS

| | | |
|---|---|---|
| 400,053 | Great Britain | Oct. 19, 1933 |
| 882,856 | Germany | July 13, 1953 |